May 23, 1961     J. B. BRENNAN     2,985,701
STORAGE BATTERY ELECTRODES
Filed June 29, 1953
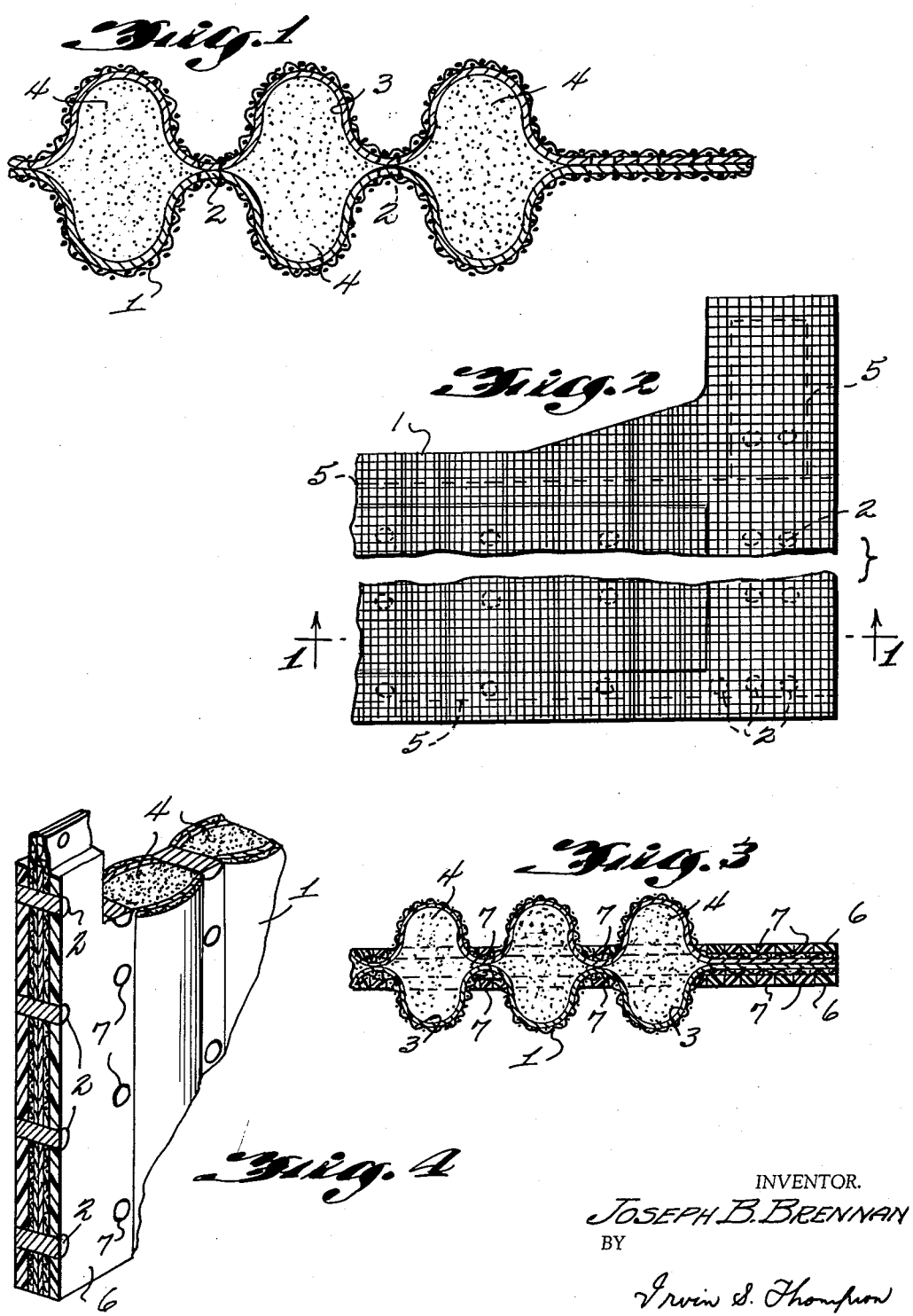
INVENTOR.
JOSEPH B. BRENNAN
BY
Irvin S. Thompson
ATTORNEY 2,985,701
Patented May 23, 1961

2,985,701

STORAGE BATTERY ELECTRODES

Joseph B. Brennan, 13018 Lake Shore Blvd., Cleveland 8, Ohio; Helen E. Brennan, executrix of Joseph B. Brennan, deceased Filed June 29, 1953, Ser. No. 364,600

3 Claims. (Cl. 136—40)

This invention relates to storage battery electrodes and methods of making same and is a continuation in part of pending application Serial No. 78,589, filed February 26, 1949 and now abandoned.

According to this invention a porous, preferably woven dielectric support is provided for pocketed porous active materials and forms an enclosure for the porous active battery materials as well as for porous metallic conductor plates to comprise an electrode suitable for use in a storage battery.

The principal object of this invention is to prevent migration of the active materials by surrounding the active materials with a porous, coherent, particulate metal layer which in turn is surrounded by, and supported by a preferably woven high tensile textile cloth such as for example a cloth made of filaments and, or yarns comprised principally of silicon oxide and aluminum oxide, or either of these materials, or of these materials in conjunction with other synthetic resin dielectric materials. Fiberglas cloth also may be used to support the liner of porous metal surrounding the entire sections of active battery material, the active battery materials being retained under pressure by tensioned cloth.

Another object of this invention is to rigidly support the above enclosed battery plate by means of an electrolytically non-reactive molded plastic rigid frame.

According to this invention the strength of the cloth dielectric retaining and spacing material will be sufficient to hold the porous metallic plate material and active materials inside of said plates in place under pressure and eliminate the necessity of having heavy metallic members in the electrodes of great strength, inasmuch as sufficient strength and pressure will be supplied by the cloth dielectric spacing and retaining members, according to this invention, to make a strong self-supporting electrode assembly.

According to this invention the electrodes can be assembled in the container so that they are mechanically spaced and insulated from each other, or, if preferred they can be placed against one another in stacked pressurized relationship, or in helically interwound relationship so that they are held near each other in place by a pressure clamp or winding, or by the cell container itself.

Referring to the drawings which accompany this specification, Fig. 1 illustrates a sectional fragment of an electrode made according to this invention taken on line 1—1 of Fig. 2 which is a flat view of an electrode made according to this invention, and Fig. 3 is a vertical section of the electrodes taken on line 3—3 of Fig. 2. Figure 4 is a perspective view of the electrode shown in Fig. 3.

1 represents a preferably woven fabric of a dielectric material which will not react with the electrolyte to be used such as, for instance, a Fiberglas cloth, and which has great strength and porosity.

The Fiberglas cloth may be partially or wholly replaced with other suitable woven dielectric fabrics such as of nylon or polyvinyl or polythene threads.

The Fiberglas cloth 1 is at least partially coated or lined with a porous layer of, for instance, sintered or spray deposited metallic particles such as lead or nickel or iron or zinc or cadmium, or other suitable metals or alloys. This porous metallic coating is illustrated at 3 and is here illustrated as being on the inside of the Fiberglas cloth 1.

The Fiberglas cloth coated with the metallic conductive coherent particles 3 is here shown for making up a series of cavities 4 filled preferably under pressure with active material such as suitable metallic oxides 4.

The layers of, for instance, Fiberglas cloth lined with porous lead layers are under tension and are preferably assembled as at 2 by means of suitable plastic cements or compounds at the points 2.

Holes may be put through the areas as shown at 2 for forcing the plastic holding material through the layers of material which it is intended to bond and the plastic holding material can be in such quantity and of such thickness that it will make the electrode rigid and self supporting if desired or flexible at certain points or areas if desired.

Fig. 3 illustrates a type of plastic support that may be used to give the electrode rigidity and also to keep the active material under compression. The support consists of two plastic corresponding frameworks, one on each side of the electrode, being welded into a single unit at interstices 2. The framework being made up of horizontal parts 6 extending along the upper and lower parts of the electrode, with connecting vertical components 7 between the cavities 4 and extending full length on the terminal part of the electrode; thereby a sturdily and rigidly constructed electrode is attained according to this invention.

Stitching by means of suitable metal dielectric threads or metal wires may be resorted to as illustrated at 5 if desired to retain the electrode in shape and to retain the active materials in place.

According to my invention, in making up these electrodes I prefer to initially coat the strong porous dielectric materials such as Fiberglas layer with an inner porous layer of metallic conductive suitable metal by spray depositing same on the porous dielectric material or by sintering and applying thereon and thereafter, having coated the areas which it is desired to bond with suitable thermoplastic and/or thermo-setting materials, I place two or more layers so coated in face-to-face relationship so that the conductive porous metallic layers are face to face and so that the thermoplastic bonding material 2 is properly aligned, and then apply heat and pressure at the points where it is desired to bond the two sheets of material together.

The inner metallic coated layers are joined together and held in rigid line relationship so as to create tubular pockets when the rigid thermoplastic frame work is applied. These pockets may be pressure filled with active material either before the rigid plastic framework is applied, or afterwards.

In this way a sufficiently stiff porous pocketed envelope is produced comprising for instance, Fiberglas cloth lined with porous metal layers filled with active battery materials and bonded together by thermoplastic or thermosetting materials or wire stitching at spaced areas or points.

Alternatively the pockets are stuffed with active material under pressure. This operation may be carried out continuously in sequence after the bonding of the metallically lined Fiberglas layers by extruding the active material under pressure into the pockets through tubes projecting therein and extruding active material therethrough.

Any amount of plastic reinforcement may be applied to make a framework for electrodes so constructed according to my invention.

The amount of active material and the shape of these pockets or the number of pockets containing active material may be varied to suit the needs and requirements of the battery into which these electrodes are to be incorporated.

The plastic framework 6 is a skeleton framework having openings through which the woven dielectric cloth protrudes either in tubular or pocketed shape.

According to this invention the active material which is inside the pockets and also inside the porous metal and enclosed thereby is retained in place both by the microscopic porosity of the particulate porous metal layer and the filter membrane effect of the Fiberglas or quartz fiber exterior cloth layer and this assembly is made rigid by the molded plastic and windowed framework.

It is also contemplated according to this invention to have the battery casing or container of, for instance thermoplastic so designed that a compression effect on the electrodes is secured on assembly either by curing the container about a dry assembly or stack of battery electrodes or by assembling the casing with cement or other holding means while clamping the electrode assembly under pressure.

In any case according to this invention I provide a rigid support of material inert to the electrolyte to retain the porous metal liner and the active material therein in place within the cell.

The conductive metallized or sintered metal surfaces for an alkaline cell may be made of spray deposited or sintered iron, cadmium, nickel or monel or copper or other well known metals.

Spray deposited or sintered iron or copper particles may be nickel plated prior to deposition or sintering as in a plating barrel or the particulate copper or iron electrodes may be nickel plated after spray depositing or sintering in strip layer form and enclosed within the Fiberglas thereafter after pasting.

Formation of the oxide layers may also be done by electroformation if desired.

Activation of the electrodes and the active materials after being made is also contemplated prior to use.

Spray deposited lead, or lead alloyed with antimony, makes a cheap and excellent electrode contact for an acid cell according to this invention. The frail porous lead lined pocket structure packed with lead oxide is made peculiarly desirable according to the structure of this invention due to the fact that much less lead is needed to attain a given capacity and also rigidity is attained beyond any known structure leading to long life, light weight and freedom from shedding so common with present lead cells.

Other plastic threaded material may be used as an enclosure also and spray deposited or sintered layers of molten plastic dielectric materials reinforced with strong inert fibers may be used as enclosures.

It is also contemplated that the porous metal of the electrodes will be impregnated with and will enclose some of the active material within its interstices or pores.

If plastic threads or monofilaments are used to make the enclosing dielectric layer the material thereof must be inert to the electrolyte.

The enclosure plus the metallized or sintered layer therein must be sufficiently porous to pass the electrolytic ions therethrough and permit free gassing and yet dense enough to prevent the passage of active material particles therethrough.

Conductive porous metal plates made for use according to this invention may be flexible or rigid according to how thick they are, but they may in any case be formed as in a press to a desired tubular or box shape and may be welded in desired areas by conventional thermal welding means.

They are sufficiently porous that plastic sheet or molten plastic such as polystyrene may be heat welded thereto, or/and impregnated therein without destroying their conductivity.

Terminals of porous metal made according to this invention may comprise an extension of the active electrode porous conductor plate, the terminal portion being impregnated with molten polystyrene so that it is conductive, light and impervious to electrolyte leakage and such terminals may be thermally bonded or cemented to plastic battery covers of polystyrene and extended therethrough to make liquid impervious barrier and terminal stud. Porous copper may be used as part of such terminals which is desirable due to its high conductivity either by itself or with other metals or with solid metal welded thereto and yet be impervious to electrolyte within the case by being impregnated and coated with polystyrene where exposed to the electrolyte. Thus a porous lead plate may have a porous copper terminal fused thereto and enclosed by polystyrene where exposed to the electrolyte. The exterior of such a terminal may be of porous copper impregnated with polystyrene and reinforced therewith. The conductivity of the porous copper is superior to solid lead and much lighter.

By the proper selection of cation and anion resins and making a porous, for example sintered membrane thereof, the exact prevention of undesirable ion migration from the active material bed both on the positive and negative electrodes may be achieved so that the ions which it is desired to retain in a given electrode may be retained therein due to the affinity of the said ion for a given thermoplastic resin.

One of the principal features of this invention is that cloth made from either glass quartz, or other ceramic fibers, not only acts as high tensile pressurized retainer for the porous metal electrode enclosed thereby, but also acts as a dielectric spacer to isolate the electrodes from each other.

The unusual filtering action which prevents migration of the active material but readily permits the passage of the oxygen ions from electrode to electrode is one of the outstanding features of this invention.

Another very important feature resides in the fact that the ceramic cloth can be placed under high tensile stress so that under all conditions of temperature oxidation and deoxidation of the electrodes, contact between the active material and a conductive porous metal is excellent.

No one heretofore has discovered how to effectively prevent shedding in a battery and no one heretofore has discovered how to apply an extremely high tensile inert relatively cheap fabric under great tension to retain the active elements of a battery plate in circuit under all conditions of temperature and use.

Having described my invention, what I claim is:

1. A storage battery electrode comprising an enclosure of woven ceramic cloth, a particulate porous coherent metal coating on the inner surface of said cloth enclosure, said coating having the particles mechanically and electrically bonded to the cloth enclosure, active battery material under pressure inside the porous metal coating and a rigid support clamped externally about said cloth enclosure, and having a terminal impervious to the seepage of electrolyte comprising a porous conductive particulate metal impregnated with a molten dielectric.

2. A storage battery electrode consisting of a pair of fibrous base sheets, a particulate porous metal coating on the inner surfaces of said sheets, said coating having the particles mechanically and electrically bonded to the inner surfaces of said sheets, means securing spaced portions of said metal coating together to produce a series of spaced pockets intermediate said base sheets, active material positioned in said pockets and a porous dielectric support integrally bonded to said sheets to make the electrode self-supporting.

3. An electrode comprising a tensioned, porous, woven, dielectric cloth enclosure substantially surrounding a particulate, coherent, porous metal lining on the inner surface of said tensioned enclosure, said lining having the particles thereof electrically and mechanically united and having active battery material enclosed and retained under pressure inside said particulate lining and tensioned woven enclosure, and wherein the active battery material is placed under pressure inside the porous metal coating, and a rigid support clamped externally about the cloth enclosure.

References Cited in the file of this patent

UNITED STATES PATENTS

| | | |
|---|---|---|
| 630,753 | Smith | Aug. 8, 1899 |
| 726,272 | Feldkamp | Apr. 28, 1903 |
| 983,062 | Kemperdyk | Jan. 31, 1911 |
| 1,500,221 | Benner | July 8, 1924 |
| 2,048,347 | Martus et al. | July 21, 1936 |
| 2,167,809 | Lubeck | Aug. 1, 1939 |
| 2,375,211 | Brennan | May 8, 1945 |
| 2,422,130 | Proctor | June 10, 1947 |
| 2,615,061 | Brandt | Oct. 21, 1952 |

FOREIGN PATENTS

| | | |
|---|---|---|
| 13,826 of 1899 | Great Britain | Sept. 16, 1899 |